No. 772,573. PATENTED OCT. 18, 1904.
W. MORCK.
VEHICLE WHEEL.
APPLICATION FILED MAR. 2, 1904.
NO MODEL.

Witnesses:
F. C. Fliedner

Inventor:
William Morck
By Geo. H. Strong. Atty

No. 772,573. Patented October 18, 1904.

UNITED STATES PATENT OFFICE.

WILLIAM MORCK, OF OAKLAND, CALIFORNIA, ASSIGNOR OF ONE-HALF TO JAMES H. DRAKE, OF MORGAN PARK, ILLINOIS.

VEHICLE-WHEEL.

SPECIFICATION forming part of Letters Patent No. 772,573, dated October 18, 1904.

Application filed March 2, 1904. Serial No. 196,227. (No model.)

*To all whom it may concern:*

Be it known that I, WILLIAM MORCK, a citizen of the United States, residing at Oakland, in the county of Alameda and State of California, have invented new and useful Improvements in Vehicle-Wheels, of which the following is a specification.

My invention relates to improvements in vehicle-wheels, and is especially designed to provide a substantially elastic wheel which will relieve the jar and shock to the vehicle in traveling over the ground.

My invention comprises combinations of parts and details of construction which will be more fully explained by reference to the accompanying drawings, in which—

Figure 1:
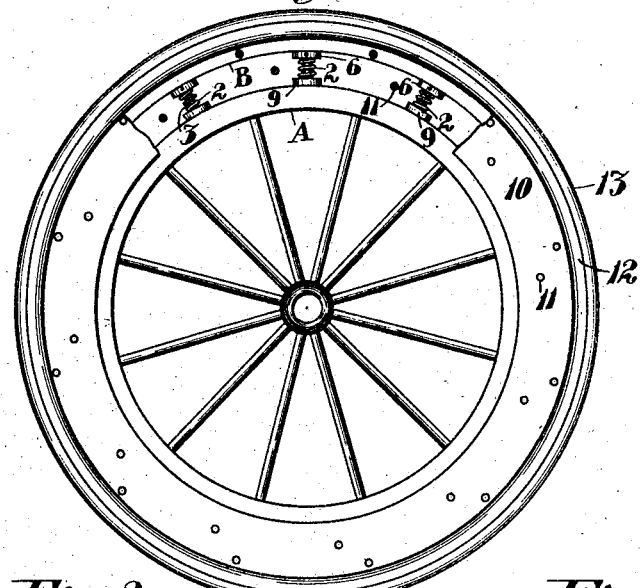
Figure 2:
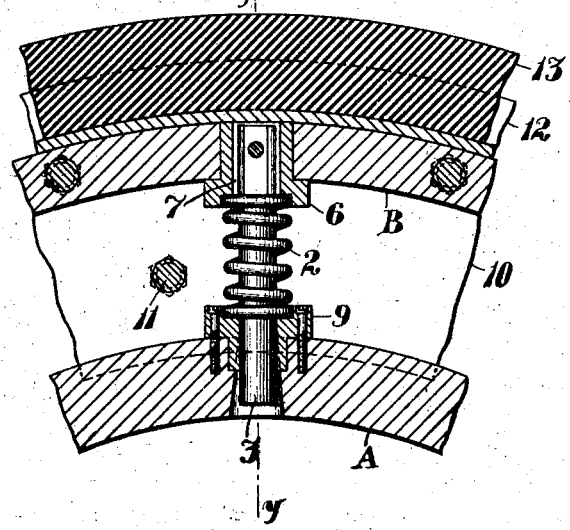
Figure 3:
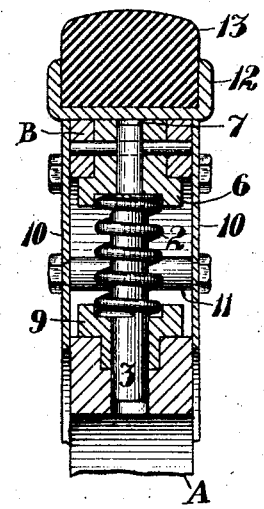

Figure 1 shows my improvement in vehicle-wheels. Fig. 2 is an enlarged sectional view of my device. Fig. 3 is a section on line $y\ y$ of Fig. 2.

It is the object of my invention to provide a substantially indestructible and elastic wheel which is especially valuable for use upon automobiles and like carriages, and may also be employed for bicycles and for other similar and equivalent purposes.

The main or inner wheel consists of a rim or felly A, having any suitable number of spokes and any suitable or well-known construction of wheel with central hub and bearings upon which the wheel may be supported or turnable. The outer rim B is of sufficiently larger diameter than the inner rim to admit of springs 2, which are here shown in the form of spiral springs, guided upon pins or bolts 3, and have their outer ends hinged in the outer rim and their inner ends slidable in openings made substantially radial through the inner rim. The springs may be of any suitable or desired number and have a size and tension depending upon the weight of the vehicle and its load, it being understood that the proportions can be accurately calculated when the weight is determined. These springs will maintain the two rims or fellies substantially concentric with each other if there is no weight upon the wheel. Whenever weight is carried by the wheel, the lower springs will be compressed and the rims will be made correspondingly eccentric with each other. As this continual change of position takes place during the revolutions of the wheel it is necessary to provide some means for allowing of the change of position between the two rims. This I effect by hinging the outer ends of the pins around which the springs are supported so that the pins 3 may swing in the plane of rotation of the wheel. I have here shown sockets 6, which are fitted into depressions or openings made in the outer rim, and these sockets have sunken depressions on the inner faces of such diameter as to receive the outer ends of the springs and retain them in proper position with relation to the pins and the other parts. The outer ends of these pins may be flattened and enter correspondingly-shaped slots 7, in which they are secured by pivot-pins, so that they may swing in the plane of rotation of the wheel, as previously described. To the inner rims are fixed similar socket-pieces 9, having countersunk depressions in the inner faces to receive and hold the inner ends of the springs, and holes are made centrally through these socket-pieces, in which the inner ends of the pins or bolts 3 are slidable. These holes may be substantially circular at the outer ends; but the inner ends should be made oval in the plane of the rim and of sufficient length to allow for the changing position of the pins by the compression of the springs without causing the pins to bind in these openings when by the compression of the springs the inner and outer rims become eccentric to each other. In order to properly guide the two rims in their movements, I have shown plates 10 secured upon each side of the outer rim and projecting inwardly, so as to inclose the periphery of the inner rim. These plates form a deep channel, within which the springs 2 and pins 3 and connecting parts are contained, concealed, and protected from injury.

11 represents guard and tie pins or bolts extending between the rims 10 at intervals around the wheel, and these bolts are so located with relation to the spring-carrying pins 3 as to limit the movement of the two rims with relation to each other and prevent their collapsing in case of accident.

Exterior to the outer rim B is a channeled metal rim 12, and this rim is adapted to receive an elastic rubber tire 13, which is formed to fit within the rim 12. In order to provide for a substantial tread without making the other parts of the wheel unduly wide, I have shown this rim 12 as being projected beyond the flanges 10 at each side, and this provides for a sufficiently-wide tread of the elastic tire 13. At the same time the projecting sides of the rim 12 serve to protect from injury the heads of the bolts which secure the flanges 10.

Having thus described my invention, what I claim, and desire to secure by Letters Patent, is—

1. The combination in a wheel of normally concentric inner and outer rims both located exterior to the outer ends of the wheel-spokes, one of said rims provided with a tire and the other rim having the outer ends of the spokes fixed to it, substantially radial springs extending between the rims, socket-pieces fixed to the opposing surfaces of the rims and having depressed seats for the ends of the springs, rods passing through the springs and each having one end pivoted in one of the sockets and the other end slidably guided in the opposing socket, and flange-plates forming an inclosed channel between the two rims.

2. The combination in a wheel of inner and outer rims with flange-plates fixed to one of said rims and forming an inclosed channel between the two, sockets in the outer rim, guide-rods having one end pivotally connected in said sockets and other sockets in the inner rim through which said rods are slidable, and elastic springs surrounding the rods between the two rims said sockets having depressed seats for the ends of the springs.

3. The combination in a wheel of inner and outer rims, socket-pieces fixed in said rims in substantially radial lines, said socket-pieces having their adjacent faces formed with depressions, guide-rods having the outer ends hinged in the outer sockets to swing in the plane of the wheel, holes in the inner sockets through which the inner ends of the rods are slidable and spiral springs surrounding said rods having their ends seated in the depressions of the socket-pieces.

4. The combination in a wheel of inner and outer normally concentric rims, socket-pieces fixed in substantially radial lines in the two rims, the outer socket having a rectangular central opening and the inner socket having an opening the inner end of which is made oval in the plane of the wheel, rods flattened and pivoted in the outer socket having the inner ends slidable in the oval openings of the inner rim, spiral springs surrounding said pins and having their ends seated in depressions in the adjacent faces of the socket-pieces.

5. The combination in a wheel of inner and outer rims with socket-pieces, substantially radial rods pivoted in the outer sockets and freely slidable through the inner ones, springs surrounding said rods having their ends seated in depressions in the socket-pieces, flanges bolted to the outer rim, and between which the inner rim is freely movable and bolts extending transversely from one flange to the other and between the radially-disposed springs.

6. The combination in a wheel of inner and outer rims, flanges fixed to the outer rims and between which flanges the inner rim is guided and slidable, socket-pieces fixed in the inner and outer rims, rods pivoted in the outer sockets to swing in the plane of the wheel, and holes in the inner sockets through which the rods are slidable, spiral springs surrounding said rods, a channeled rim fixed to the outer rim and an elastic tire fitting therein.

In testimony whereof I have hereunto set my hand in presence of two subscribing witnesses.

WILLIAM MORCK.

Witnesses:
S. H. NOURSE,
HENRY P. TRICOU.